Figure 1:
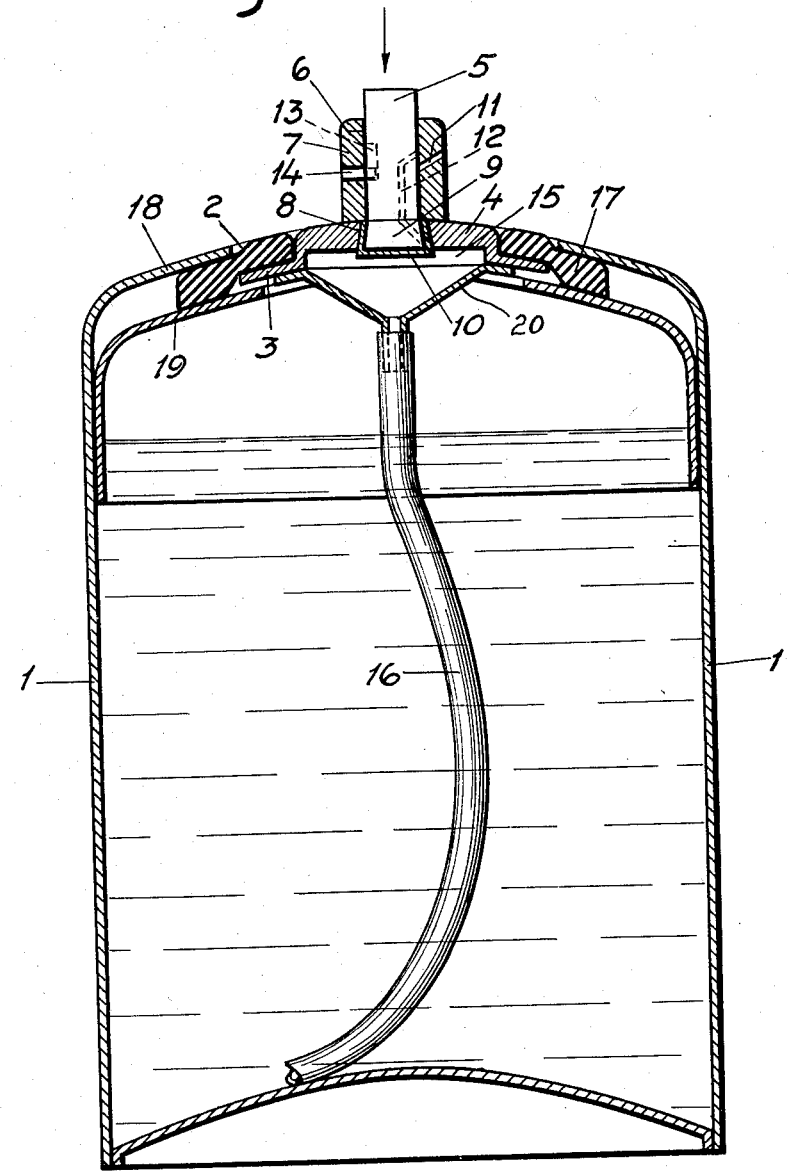

Oct. 13, 1959  A. CARLSSON  2,908,297
LIQUID SPRAYERS

Filed Oct. 12, 1954  2 Sheets-Sheet 1

Inventor:
Alvar Carlsson.
By Pierce, Scheffler & Parker
his Attorneys

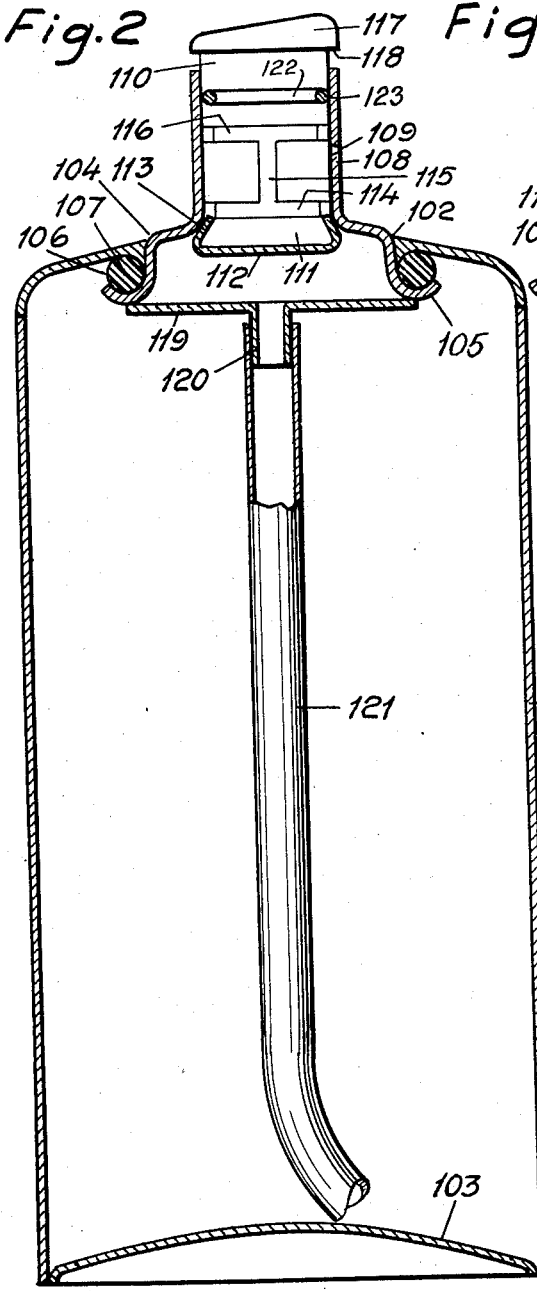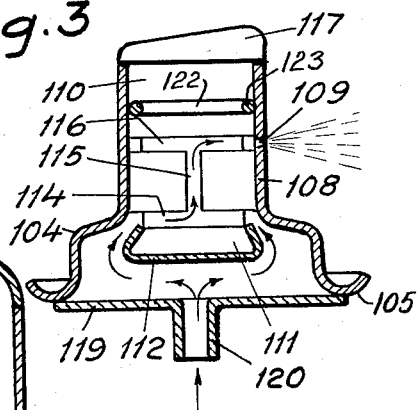

United States Patent Office 2,908,297
Patented Oct. 13, 1959

2,908,297
LIQUID SPRAYERS
Alvar Carlsson, Stockholm, Sweden

Application October 12, 1954, Serial No. 461,829

Claims priority, application Sweden October 15, 1953

4 Claims. (Cl. 141—20)

The present invention relates to liquid sprayers, for instance for smelling water, perfume and the like.

Such sprayers are already known, comprising a closed containing with an outlet valve that can be opened manually, which valve may or may not be provided with a nozzle, the said container containing liquid under gas pressure, for example Eau de Cologne or the like.

These are filled and closed hermetically at the factory and cannot simply be filled again after having been emptied, but are to be thrown away. Thereby the apparatus will be relatively uneconomic.

According to the present invention this disadvantage is eliminated. The valve which can be manually opened is provided in a sealing member which by the gas pressure in the container is held sealingly against the edges of an opening in the container.

The invention is illustrated by means of a couple of embodiments in the accompanying drawing in which Fig. 1 shows an axial section through a sprayer according to the invention. Fig. 2 is an axial section through through another embodiment and Fig. 3 is a detail section.

Referring now to the drawing 1 designates a container of a material resistive to internal pressure. The said container 1 is at the top provided with a central round or oval opening 2 through which there is inserted a flange 3 provided on a sealing member 4 in which a valve body 5 is arranged. The valve body 5 is slidably disposed in a bore 6 formed in a sleeve 7 upstanding upon and secured to sealing member 4. A circular tapered aperture through the sealing member 4 in alignment with the bore 6 establishes a conical valve seat 8 for a correspondingly formed head 9 on the valve body 5 and which may be provided with a sealing cover 10. In the sleeve 7 a substantially radial outlet channel 11 is provided, through which the bore 6 communicates with the outer air, and the valve body 5 is provided with a channel 12, which when the valve is open, connects the interspace between the valve body and the valve seat with the outlet channel 11. The valve body is also provided with a groove 13 which is engaged by a pin 14 projecting into the bore 6 in order to limit the motion of the valve body.

The sealing member 4 together with funnel shaped element 20 forms a chamber 15 which communicates with a flexible tube 16 which extends to the bottom of the container 1.

Between the edge of the opening 2 of the container 1 and the flange 3 of the sealing member 4 a rubber packing 17 or the like is inserted. In order to hold the said packing in position the container 1 is provided with a supporting flange 19 preferably at some distance from the upper wall 18.

When the container is to be filled, the rubber packing 17 and the sealing member are first taken away. Thereafter liquid is filled into the container nearly to the supporting flange 19, and a piece of carbon dioxide snow is introduced, after which the sealing member 4 and the rubber packing 17 are inserted.

Owing to the carbonic acid produced the pressure in the container 1 is increased almost immediately, so that the flange 3 of the sealing member 4 is pressed against the rubber packing 17 which in turn is pressed against the upper wall 18 so that sealing is effected. At the same time the valve body 5 is pressed outwards by the internal pressure, so that it seals against the valve seat 8.

Afterwards when the valve body is actuated in the direction of the arrow, the valve opens and the pressure of the carbonic acid forces liquid out through the outlet channel 11. When the valve body 5 is released, the valve is closed again by the internal pressure.

In the embodiment shown in Figs. 2 and 3 the numeral 101 designates a container which at the top is provided with a circular opening 102. Through this opening a sealing member 104 with a flange 105 with a diameter which is larger than the diameter of the opening 102, is introduced from below, before the bottom 103 of the container 101 is welded on. A rubber ring 106 is placed on the flange 105 which rubber ring cooperates with the edge 107 of the opening 102 for the purpose of sealing.

The sealing member 104 is at the top formed as a cylinder 108 which is open in both ends and approximately in the middle provided with an outlet channel 109, a piston 110 being movable in the said cylinder, which piston has at the bottom a conical valve body 111 with a rubber cap 112 which seals against the lower edge 113 of the cylinder 108, the said edge forming a valve seat. In the envelope surface of the piston 110 an annular channel 114 is formed at the lower edge which communicates through an axial channel 115 with an annular channel 116, which, when the piston is depressed to a lower level, is positioned exactly opposite the outlet channel 109. To the upper end of the piston 110 a push button 117 is attached which forms a stop surface 118 for limiting the downward motion of the piston.

An annular channel 122 with a sealing ring 123 is provided in the envelope surface of the piston above the channel 116.

The sealing member 104 forms together with the lower part of the piston 110 and a plate 119 welded to the flange 105, a chamber which communicates through a flexible tube 121 connected to a connection piece 120 on the plate 119 with the lower part of the container 101.

The container is filled in the following way:

A snare or the like is put round the cylinder 108 and the sealing member 104 is lowered down so much that liquid can be filled into the container, the amount of liquid being about nine tenths of the liquid for which the apparatus is intended, after which a suitable quantity of carbon dioxide snow is added. Thereafter the sealing member is drawn upwards by means of the snare until the rubber ring seals against the edge of the opening 102. The overpressure caused by the carbon dioxide snow then holds the sealing member closed.

When the piston 110 is depressed so that the channel 116 will be positioned exactly opposite the outlet channel 109, the valve 111, 112, 113 will be opened, and liquid is pressed by the inner overpressure through the channels 114, 115, 116 and out through the outlet opening 109 as indicated by arrows in Fig. 3.

Having now described my invention what I claim as new and desire to secure by Letters Patent is:

1. A refillable container adapted to be filled with a liquid fluid under gas pressure, said container having an opening in one wall only thereof through which the fluid is introduced into the container, the gas pressure on the fluid being thereafter generated, and a combined, releasable closure and valve assembly for closing said wall opening subsequent to filling the container and thereafter dispensing the fluid, said assembly including a closure member, a dispensing valve mounted centrally on said closure member, said closure member including means forming a chamber below and communicating with the path of liquid flow through said valve, a tube extending from said chamber to the bottom of said container, said closure member also including a peripheral flange, and a sealing ring intermediate said flange and the marginal portion of said wall opening, said sealing ring engaging the upper side of said flange at its underside and engaging the underside of the marginal portion of said wall opening at its upperside, said flange being sealed with respect to said wall opening only by being acted upon by the gas pressure created in the filled container to establish an outward force on said flange in the direction of said sealing ring and said marginal portion of said wall opening.

2. A refillable, valve controlled container as defined in claim 1 wherein the flange on said closure member is larger than the opening in said container so as to overlap the marginal portion of said opening whereby said closure member is permanently retained within the container after having been inserted into the container from the end opposite said opening before said end was permanently closed.

3. A refillable, valve controlled container as defined in claim 1 wherein said valve comprises a tubular, open-ended valve body, said valve body being provided with a discharge opening and forming part of said combined closure and valve assembly, a cylindrical valve member displaceably mounted in said valve body and adapted to be manually pushed inwards, said valve member having a frusto-conical inner end mating with a complementary seat in said combined closure and valve assembly and also having two peripheral, annular channels and an axial channel interconnecting said annular channels, said chamber being connected to said discharge opening through said channels when said valve member is pushed inwards, so that liquid fluid is discharged by the action of said gas pressure.

4. A refillable, valve-controlled container as defined in claim 1 wherein said flange on said closure member is smaller than the edge of said wall opening, said sealing ring engaging the upper side of said flange at its inner underside and engaging the underside of the marginal portion of said wall opening at its upper outerside and wherein said container includes a flange spaced inwardly from said wall opening and which engages the outer underside of said sealing ring.

References Cited in the file of this patent
UNITED STATES PATENTS

| | | |
|---|---|---|
| 2,322,236 | Ingram | June 22, 1943 |
| 2,552,923 | Appel | May 15, 1951 |
| 2,686,652 | Carlson | Aug. 17, 1954 |
| 2,699,890 | Appel et al. | Jan. 18, 1955 |